United States Patent
Xianglin

(10) Patent No.: US 10,185,038 B2
(45) Date of Patent: Jan. 22, 2019

(54) INTEGER AMBIGUITY-FIXED PRECISE POINT POSITIONING METHOD AND SYSTEM

(71) Applicant: Fugro N.V., Leidschendam (NL)

(72) Inventor: Liu Xianglin, Leidschendam (NL)

(73) Assignee: Fugro N.V. (NL)

( * ) Notice: Subject to any disclaimer, the term of this patent is extended or adjusted under 35 U.S.C. 154(b) by 459 days.

(21) Appl. No.: 14/854,758

(22) Filed: Sep. 15, 2015

(65) Prior Publication Data

US 2016/0077213 A1     Mar. 17, 2016

(30) Foreign Application Priority Data

Sep. 15, 2014  (NL) ..................... 2013472

(51) Int. Cl.
*G01S 19/44* (2010.01)
*G01S 19/07* (2010.01)
*G01S 19/24* (2010.01)

(52) U.S. Cl.
CPC .............. *G01S 19/44* (2013.01); *G01S 19/07* (2013.01); *G01S 19/24* (2013.01)

(58) Field of Classification Search
CPC .......... G01S 19/44; G01S 19/07; G01S 19/24
USPC ................................... 342/357.27
See application file for complete search history.

(56) References Cited

U.S. PATENT DOCUMENTS

| | | | |
|---|---|---|---|
| 9,157,999 B2 * | 10/2015 | Leandro .................. | G01S 19/04 |
| 2011/0090116 A1 * | 4/2011 | Hatch ...................... | G01S 19/20 |
| | | | 342/357.59 |
| 2011/0140958 A1 | 6/2011 | Henkel et al. | |
| 2015/0293233 A1 * | 10/2015 | De Jong .................. | G01S 19/04 |
| | | | 342/357.27 |

FOREIGN PATENT DOCUMENTS

WO      2014065664 A1     5/2014

OTHER PUBLICATIONS

International Search Report for The Netherlands application No. 2013472; dated Jun. 2, 2015.
Shi, Junbo et al.; "A comparison of three PPP integer ambiguity resolution methods"; Received Jan. 29, 2013; Accepted Oct. 17, 2013; Published online Oct. 31, 2013; Springer-Verlag Berlin Heidelberg 2013.

* cited by examiner

*Primary Examiner* — Harry K Liu
(74) *Attorney, Agent, or Firm* — Polsinelli PC

(57) ABSTRACT

A method for providing and applying Precise Point Positioning-Integer Ambiguity Resolution (PPP-IAR) corrections for a Global Navigation Satellite System (GNSS). In a GNS signal correction system, PPP-IAR corrections (ambiguities plus receiver and satellite hardware delays) are calculated based on observation data ($P_{i,a}$, $\Phi_{i,a}$) of n satellites for individual reference stations using a functional model, and these individual PPP-IAR corrections are merged into one single and larger set of PPP-IAR corrections. In a broadcast system, the (merged) PPP-IAR corrections are encoded at a System Control Centre (SCC) and transmitted to mobiles. In a mobile system a similar functional model is used to calculate a correction Δx to an a priori position.

20 Claims, 1 Drawing Sheet

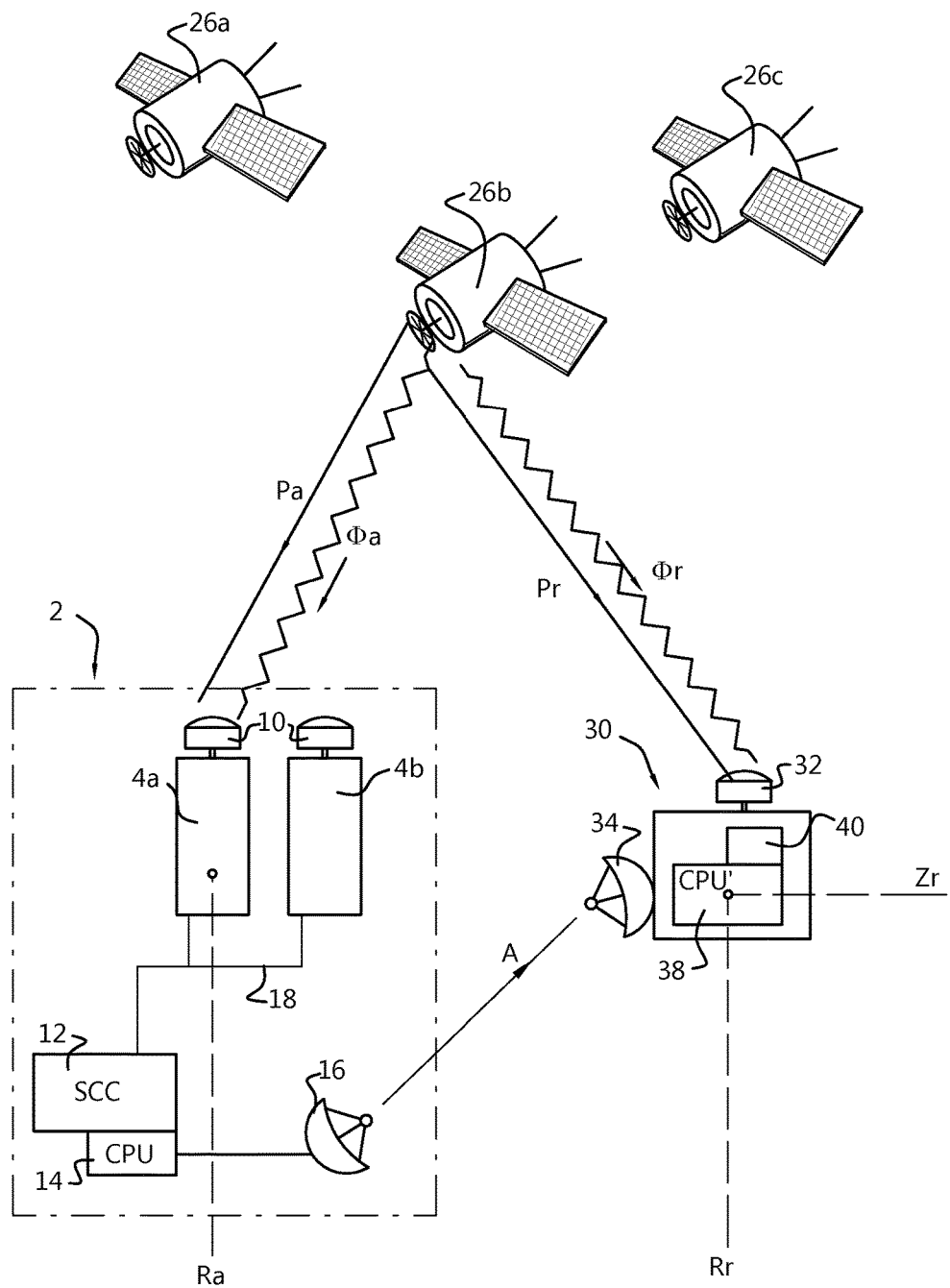

INTEGER AMBIGUITY-FIXED PRECISE POINT POSITIONING METHOD AND SYSTEM

CROSS REFERENCE TO RELATED APPLICATIONS

This application claims priority from Dutch Patent Application No. 2013472, filed Sep. 15, 2014, the contents of which are entirely incorporated by reference herein.

TECHNICAL FIELD

The present invention relates to a method for providing Precise Point Positioning-Integer Ambiguity Resolution (PPP-IAR) corrections of a global navigation satellite system (GNSS). In a further aspect, the present invention relates to a method for applying Precise Point Positioning-Integer Ambiguity Resolution (PPP-IAR) corrections and position determination of a mobile station.

BACKGROUND

A Global Navigation Satellite System (GNSS) is a system of satellites that can be used for determining the geographic location of a mobile receiver with respect to the earth. GNSS include GPS, Galileo, Glonass and BeiDou. Various global navigation satellite (GNS) correction systems are known that are configured for receiving GNSS signal data from the GNSS satellites, for processing these GNSS data, for calculating GNSS corrections from the GNSS data, and for providing these corrections to a mobile, with the purpose of achieving quicker and more accurate calculation of the mobile's geographic position.

Various position estimation methods are known wherein the position calculations are based on repeated measurement of the so-called pseudo range and carrier phase observables by Earth based GNSS receivers. The "pseudo range" or "code" observable represents a difference between transmit time of a GNSS satellite signal and local receive time of this satellite signal, and hence includes the geometric distance covered by the satellite's radio signal. In addition, measurement of the alignment between the carrier wave of the received GNSS satellite signal and a copy of such a signal generated inside the receiver provides another source of information for determining the apparent distance between the satellite and the receiver. The corresponding observable is called the "carrier phase", which represents the integrated value of the Doppler frequency due to the relative motion of the transmitting satellite and the receiver. Any pseudo range observation comprises inevitable error contributions, among which are receiver and transmitter clock errors, as well as additional delays caused by the non-zero refractivity of the atmosphere, instrumental delays, multipath effects, and detector noise. Any carrier phase observation additionally comprises an unknown integer number of signal cycles that have elapsed before a lock-in to this signal alignment has been obtained, which number is referred to as the "carrier phase ambiguity". Usually, the observables are measured i.e. sampled by a receiver at discrete consecutive times. The index for the time at which an observable is measured is referred to as an "epoch". The known position determination methods commonly involve a dynamic numerical value estimation and correction scheme for the distances and error components, based on measurements for the observables sampled at consecutive epochs.

The following definitions are used herein to define additional concepts that are commonly known and used in the field of GNSS signal processing. The term "measurement" refers herein to a sampled numeric value resulting from actual measurement of an observable. The term "measurement equation" or "functional model" refers to the mathematical relations between the parameters (i.e. a collection of variable quantities that are assumed to be sufficient for unambiguously describing the behavior of the system, but which are in general not directly measurable) and the measurements (which are snapshots of measurable system parameters i.e. observables, but as such insufficient for predicting future system behavior), as well as the expected evolution of the system state variables in time. The underlying system state variables in the measurement equation are dynamically estimated and intermittently corrected based on new measurements. The term "dynamic estimation" of a parameter refers herein to the process of repeatedly calculating a numeric value for this parameter at subsequent times based on the system state model, either via prediction of the assumed temporal evolution of this parameter, or via correction of the predicted value based on newly acquired measurements.

Several methods for Precise Point Positioning (PPP) with Integer Ambiguity Resolution (IAR) have been proposed, wherein carrier phase ambiguities are estimated in real time, that is based on measurement of GNSS observables by a network of reference stations. The greatest challenge in each of these methods is to define a dynamic state model by means of which the repetitive state estimations can be calculated in a numerically stable manner. This is essential for robust GNSS correction calculation and subsequent accurate mobile position determination.

The published application PCT/NL2013/050747 of the present applicant described a method and system for GNSS based position determination using one or more reference stations and dissemination of correction data to mobile stations. The correction data comprises mixed code-and-phase system hardware delays.

SUMMARY OF INVENTION

The present invention seeks to provide an improved and alternative method and system for Precise Point Positioning systems for both global and regional use using Global Navigation Satellite Systems, especially for real-time kinematic calculations.

According to the present invention, a method according to the preamble defined above is provided, the method comprising calculating PPP-IAR corrections based on observation data ($P_{i,a}$, $\Phi_{i,a}$) for n satellites at one or more reference stations a with a known location, using a functional model. The functional model is defined as a relation between an observation vector comprising the observation data ($P_{i,a}$, $\Phi_{i,a}$) at the reference station a, and a state vector comprising a zenith troposheric delay term $T_a$, a clock bias term $t_a$, an ionospheric delay term $I_a$, and a set of hardware delay terms A. The functional model is implemented to include in the hardware delay terms A a lumped contribution from satellite and reference station hardware delays, and the PPP-IAR corrections comprise the set of hardware delay terms A. As a result no code hardware delays are needed as corrections. The present invention embodiments provide an alternative parameterization to estimate hardware delays, troposphere and ionosphere from individual reference stations. The present invention provides a methodology of separating hardware delays from integer ambiguities and merging hardware delays of individual reference stations to one single and larger set of hardware delays. The present invention embodiments focus on providing of hardware delays (i.e. PPP-IAR corrections) of the network side to the mobile side without exclusion of using ionosphere and troposphere corrections in a small region. This does particularly meet the needs of precise positioning of offshore users, as the ionosphere and troposphere corrections are site-dependent, which limit to use them for larger scale of region.

In a further aspect, the present invention relates to a method for applying Precise Point Positioning-Integer Ambiguity Resolution (PPP-IAR) corrections and position determination of a mobile station r. The method comprises acquiring GNSS data comprising pseudo range mobile observations and carrier phase mobile observations from a plurality of GNSS satellites, receiving PPP-IAR corrections from a GNS signal correction system, the PPP-IAR corrections comprising hardware delay terms A, and applying the PPP-IAR corrections to a functional model.

The functional model is defined (as in the embodiments referred to above) as a relation between an observation vector comprising the observation data $(P_{i,r}, \Phi_{i,r})$ at the mobile station r, and a state vector comprising an a priori position correction $\Delta x$, a zenith troposheric delay term $T_r$, clock bias terms $t_{p1,r}, t_{p2,r}, t_{\Phi 1,r}, t_{\Phi 2,r}$, an ionospheric delay term $I_r$, and hardware delay terms A in the form of the received set of PPP-IAR corrections. The functional model is implemented to include in the hardware delay terms A a lumped contribution from satellite and reference station hardware delays.

In further embodiments, the PPP-IAR corrections of individual reference stations comprise two-frequency integer ambiguities together with actual hardware delays of satellites and/or receivers. For local users having sufficient common satellites, the PPP-IAR corrections of an individual reference station are already ready to be transmitted to any mobile receiver, allowing forming double-difference ambiguities and consequently fixing them to their integer values. For regional users, the PPP-IAR corrections are merged into one larger set of corrections in a further group of embodiments.

According to the present invention, an alternative parameterization is used under consideration of precise orbits and clocks determination using the ionosphere-free code and carrier phase, instead of raw L1 and L2 measurements. In this case, no code hardware delays need to be estimated. In addition, the present invention embodiments do not need to use an explicit reference satellite, the method can then be implemented much more efficiently than prior art PPP methods.

According to the present invention, it is assumed that in both reference side and mobile side the same satellite orbit and clock parameters are removed (or corrected) by precise products determined in (near) real-time from stations of a global network.

This method and further embodiments thereof may be implemented in a further aspect of the present invention, i.e. a GNS signal correction system for estimating and transmitting GNS signal corrections to a mobile station.

In a further aspect, a method is provided for Precise Point Positioning-Integer Ambiguity Resolution (PPP-IAR) using corrections for a global navigation satellite system, the method comprising computing PPP-IAR corrections of individual reference stations in a reference network, merging PPP-IAR corrections of all individual reference stations into one set of corrections, transmitting the merged PPP-IAR corrections at the SCC, receiving the merged PPP-IAR corrections at a mobile receiver r, and calculating a correction $\Delta x$ to an a priori position using a functional model, which is defined as a relation between an observation vector and a state vector.

BRIEF DESCRIPTION OF DRAWINGS

Embodiments will now be described, by way of example only, with reference to the accompanying schematic drawings in which corresponding reference symbols indicate corresponding parts.

The FIGURE shows a schematic diagram of an exemplary GNS signal correction system according to an embodiment.

DESCRIPTION OF EMBODIMENTS

Several approaches to PPP or Precise Point Positioning Real Time Kinematic (PPP RTK) exist, which methods can be employed for precise real-time GNSS positioning services. Integer ambiguity resolution (IAR) is a key technique for such services, and required for obtaining fast and accurate solutions. Herein below, embodiments of a PPP IAR-method for improving precision and/or reducing convergence time of precise real-time GNSS positioning services are elucidated.

The present invention embodiments relate to the published international patent application PCT/NL2013/050747 (PPP-RTK method and system for GNSS signal based position determination), which is incorporated herein by reference. The new features of the present method embodiments are as follows: 1) The present method and system take into account the fact that the provided satellite clock corrections are computed using the ionosphere-free (IF) combination observations rather than L1 and L2 raw observations. Therefore the provided satellite clock contains the IF code hardware delays. 2) The parameterization strategy of the present invention is therefore different from the prior art, i.e. no code hardware delay is needed to be included in the calculations, resulting in more efficient estimation of the remaining parameters. 3) Thanks to that, there is no need to select a reference satellite either for the generation of the PPP-IAR corrections. 4) There is no need to broadcast the code hardware delay neither to a mobile station. 5) The present method and system propose an efficient algorithm to merge the PPP-IAR correction of multiple reference stations from a larger region, or even from a global scale, to a single set of corrections. The method is particularly applicable to offshore users which are often far away from the onshore reference stations. 6) The present method and system significantly save the correction transmission bandwidth. 7) The present method and system provide an alternative algorithm to apply the PPP-IAR corrections and to determine the precise position of mobiles.

As illustrated in the schematic diagram of the FIGURE, the proposed approach uses a GNS signal correction system 2 comprising one or several reference receivers 4a, 4b (or reference station a as used below) with associated GNSS antennae 10, as well as the system control facility 12 and the computation facility 14, to continuously compute floating value hardware delays (or more precise, carrier phase ambiguity corrections, A) in the satellite carrier state equations from GNSS signals received from a plurality of GNSS satellites 26a-c (or GNSS satellites s). Once computed, these delays (corrections A) may be applied to data from any mobile station or rover 30 located over 1000 km away from the network, in order to resolve integer ambiguities in the PPP IAR mode. This will not only result in faster convergence, but also in a more precise solution. The proposed PPP IAR based GNSS correction calculation method and mobile station 30 positioning method exploit pseudo range system observations Pa and carrier phase system observations Φa acquired by the reference station(s) 4a, 4b, and pseudo range mobile observations Pr and carrier phase mobile observations Or acquired by the mobile 30 respectively. In addition to carrier phase ambiguity corrections A, also ionospheric and tropospheric corrections are estimated and may be made available as well (optional for use in a small region).

In general, a real-time service based on the proposed PPP IAR method requires GNSS signals from the plurality of GNSS satellites 26a-c and a GNS signal correction system 2. One reference station 4a or several reference stations 4a, 4b (a network of reference stations) are provided for receiving the GNSS satellite signals and provide data to a System Control Centre (SCC) 12 for collecting reference station data, for processing reference station data to generate GNSS corrections A, for encoding corrections, and for distributing encoded corrections to mobile users. A real-time data link 18 may be provided between the at least one reference station 4a, 4b and the SCC 12. The at least one reference stations 4a, 4b may be located as a small reference network, but may even be positioned at very long distances apart (e.g. at known land based locations at each side of an ocean). A system processor unit 14 is provided which is configured for performing calculations as described in the method embodiments below, in combination with a system signal transmitter 16 for transmitting the GNSS corrections A to the mobile station 30 in real time.

Furthermore, the mobile or rover 30 is configured with software for real-time processing of GNSS receiver data and PPP IAR based GNSS corrections A. A mobile station 30 comprises a GNSS (e.g. GPS) receiver 32, an (optional) user interface unit 40, as well as a dedicated processing unit 38 for applying and implementing the method embodiments as described below. The processing unit 40 is arranged to receive the pseudo range mobile observations Pr and carrier phase mobile observations Or from the GNSS antenna 32. The dedicated processing unit 38 co-operates with a separate receiving antenna 34 for receiving correction data as transmitted by the GNS signal correction system 2.

GNSS Measurement Model and Estimation of Satellite Clock Biases

The present method embodiments assume that the precise predicted satellite orbits and clocks are provided. The focus of the method is to estimate and apply the PPP-IAR corrections. In order to reparametrize the functional models used in reference side and mobile side, a brief description of how satellite clocks are normally estimated is given. The measurement equation for a code observation p and a phase observation φ at station a to satellite s (s=1 . . . n), at frequency i (i=1, 2), and time t, both expressed in meters, reads $$p_{i,a}^s = R_a^s + m_a^s \cdot T_a + c\delta t_a - c\delta t^s + \gamma_i I_a^s + d_{p_i,a} - d_{p_i}^s$$

$$\phi_{i,a}^s = R_a^s + m_a^s \cdot T_a + c\delta t_a - c\delta t^s - \gamma_i I_a^s + d_{\phi_i,a} - d_{\phi_i}^s + \lambda_i N_{i,a}^s \quad (1)$$

where $R_a^s$ is the geometric range between reference station and satellite, $T_a$ the zenith tropospheric delay with mapping function $m_a^s$, c the speed of light, $\delta t_a$ and $\delta t^s$ the receiver and satellite clock bias, respectively, $\gamma_i = f_1^2/f_i^2$, $f_i$ the carrier frequency of carrier phase, $I_a^s$ the ionospheric effect; $d_{p_i,a}$ and $d_{\phi_i,a}$ are the receiver hardware delays (or biases) on code and phase, respectively, $d_{p_i}^s$ and $d_{\phi_i}^s$ the satellite hardware delays (or biases) on code and phase, respectively, where it is assumed that these satellite hardware delays are relatively stable in time, $N_i$ the integer carrier ambiguity, and $\lambda_i = c/f_i$ the carrier wavelength. The measurement noise is not written in the observation equations for brevity.

The IF observations are used in the satellite clock estimation, therefore we have the observation equations:

$$p_{3,a}^s = R_a^s + m_a^s \cdot T_a + c\delta t_a - c\delta t^s + d_{p_3,a} - d_{p_3}^s$$

$$\phi_{3,a}^s = R_a^s + m_a^s \cdot T_a + c\delta t_a - c\delta t^s + d_{\phi_3,a} - d_{\phi_3}^s + \lambda_3 N_{3,a}^s \quad (2)$$

where $p_{3,a}^s$ and $\phi_{3,a}^s$ are code and phase IF observations, respectively; $d_{p_3,a}$ and $d_{\phi_3,a}$ are the IF receiver hardware delays (or biases) on code and phase, respectively;

$$d_{p_3,a} = \frac{\gamma_2}{\gamma_2 - \gamma_1} d_{p_1,a} - \frac{\gamma_1}{\gamma_2 - \gamma_1} d_{p_2,a}$$

$$d_{p_3}^s = \frac{\gamma_2}{\gamma_2 - \gamma_1} d_{p_1}^s - \frac{\gamma_1}{\gamma_2 - \gamma_1} d_{p_2}^s \quad (3)$$

$d_{p_3}^s$ and $d_{\phi_3}^s$ are the IF satellite hardware delays (or biases) on code and phase, respectively;

$$d_{\phi_3,a} = \frac{\gamma_2}{\gamma_2 - \gamma_1} d_{\phi_1,a} - \frac{\gamma_1}{\gamma_2 - \gamma_1} d_{\phi_2,a}$$

$$d_{\phi_3}^s = \frac{\gamma_2}{\gamma_2 - \gamma_1} d_{\phi_1}^s - \frac{\gamma_1}{\gamma_2 - \gamma_1} d_{\phi_2}^s \quad (4)$$

$\lambda_3$ denotes the so-called narrow-lane wavelength, which equals $$\frac{c}{f_1 + f_2};$$

$N_{3,a}^s$ is the carrier ambiguity, which is a combination of L1 (i.e. $N_{1,a}^s$ on L1 phase) and wide-lane (i.e. $N_{5,a}^s = N_{1,a}^s - N_{2,a}^s$) ambiguities, $$N_{3,a}^s = N_{1,a}^s + \frac{f_2}{f_1 - f_2} N_{5,a}^s \quad (5)$$

It should be mentioned that $N_{3,a}^s$ itself has no integer nature.

The clock filtering makes use of the IF code and phase combinations collected at reference sides to compute satellite clock corrections in real-time. Assuming that the coordinates of reference stations are precisely known and precise predicted orbits are used, the geometric range between receiver and satellite $KY_a$ can be computed. Therefore, the observation equations as described above can be written as follows:

$$\delta p_{3,a}^s = m_a^s \cdot T_a + c\delta t_a - c\delta t^s + d_{p_3,a} - d_{p_3}^s$$

$$\delta \phi_{3,a}^s = m_a^s \cdot T_a + c\delta t_a - c\delta t^s + d_{\phi_3,a} - d_{\phi_3}^s + \lambda_3 N_{3,a}^s \quad (6)$$

with $\delta p_{3,a}^s = p_{3,a}^s - R_a^s$ and $\delta \phi_{3,a}^s = \phi_{3,a}^s - R_a^s$. A common receiver and a common satellite clock for both code and phase measurements are considered, therefore, the receiver and satellite hardware code delays are lumped into the clock terms, respectively. The previous equations can be reparametrized as:

$$\delta p_{3,a}^s = m_a^s \cdot T_a + b_a - b^s$$

$$\delta \phi_{3,a}^s = m_a^s \cdot T_a + b_a - b^s + \lambda_3 a_{3,a}^s \quad (7)$$

-continued $$b_a := c\delta t_a + d_{p_3,a} \tag{8}$$
$$b^s := c\delta t^s + d^s_{p_3}$$
$$a^s_{3,a} := N^s_{3,a} + \frac{1}{\lambda_3}\left(d_{\phi_3,a} - d^s_{\phi_3} - d_{p_3,a} + d^s_{p_3}\right)$$

where $b_a$, $b^s$ and $a_{3,a}^s$ are, respectively, receiver clock, satellite clock and hardware delay terms. It should be mentioned that the hardware delay term contains both actual code and phase hardware delay plus ambiguity. Still the satellite (and receiver) clock cannot be estimated without choosing a datum or reference. The real clock correction contains a datum D as follows:

$$\tilde{b}^s := c\delta t^s + d^s_{p_3} + D \tag{9}$$

where, for example $$D := (c\delta t^{ref} + d^{ref}_{p_3})$$

when a reference satellite is selected as the datum, or $$D := -\frac{1}{n}\left(c\delta t^1 + c\delta t^2 + \cdots + c\delta t^n + d^1_{p_3} + d^2_{p_3} + \cdots + d^n_{p_3}\right)$$

when the average of all satellite clocks is chosen as the datum.

Generation of PPP-IAR Corrections from a Single Reference Station

As soon as the precise orbits and clocks are provided, the PPP-IAR corrections can be estimated. Several methods for PPP-IAR have been proposed in the articles Ge et al, "Resolution of GPS carrier-phase ambiguities in Precise Point Positioning (PPP) with daily observations", Journal of Geodesy, 82, 7, 2008, pp. 389-399, and Laurichesse and Mercier, "Integer ambiguity resolution on undifferenced GPS phase measurements and its application to PPP", Proceedings ION GNSS 2007, Sep. 25-28, 2007, Fort Worth, Tex. The wide-lane hardware delays are firstly computed using the geometry-free Melbourne-Wuebbena code and wide-lane phase measurements, and then the narrow-lane hardware delays for all satellites are computed. The narrow-lane hardware delays are determined using the relation that the IF ambiguity is a combination of wide-lane and narrow-lane hardware delays. In these prior art methods, the ionosphere effects are eliminated with a sacrifice of reducing of observations. The present method embodiments use an ionosphere estimation strategy.

The ionospheric effects can be estimated together with other parameters using raw L1 and L2 measurements. In the following, again s is a satellite index; a is a reference station index; i is a carrier frequency index.

The observation equation for a code measurement can be written as $$\delta p^s_{i,a} = m^s_a T_a + c\delta t_a - c\delta t^s + \gamma_i I^s_a + d_{p_i,a} - d^s_{p_i} \tag{10}$$

where i=1, 2 for the L1 and L2 frequency. Applying the satellite clocks and reparametrizing the equation, we have $$\delta\tilde{p}^s_{i,a} = m^s_a T_a + t_a + \gamma_i \tilde{I}^s_a \tag{11}$$

$$t_a := c\delta t_a - \frac{\gamma_2}{\gamma_1 - \gamma_2} d_{p_1,a} + \frac{\gamma_1}{\gamma_1 - \gamma_2} d_{p_2,a} + D \tag{12}$$

$$\tilde{I}^s_a := I^s_a + \frac{\gamma_1}{\gamma_1 - \gamma_2}\left(d_{p_1,a} - d_{p_2,a} + d^s_{p_2}\right) \tag{13}$$

Notice that the ionosphere term comprises the receiver and satellite code hardware delay. The left-hand side of the first equation is computed as follows:

$$\delta\tilde{p}^s_{i,a} = \delta p^s_{i,a} + \tilde{b}^s \tag{14}$$

$\delta\tilde{p}^s_{i,a}$ are calculated from pseudo range observation $p^s_{i,a}$, the distance between the precise satellite position and the station $R^s_a$ and the precise clock offset $\tilde{b}^s$.

For a phase measurement $$\delta\phi^s_{i,a} = m^s_a T_a + c\delta t_a - c\delta t^s - \gamma_i I^s_a + d_{\phi_i,a} - d^s_{\phi_i} + \lambda_i N^s_{i,a} \tag{15}$$

Applying the satellite clocks and reparametrizing the equation, we have $$\delta\tilde{\phi}^s_{i,a} = m^s_a T_a + t_a - \gamma_i \tilde{I}^s_a + \lambda_i a^s_{i,a} \tag{16}$$

where i=1, 2 and $$a^s_{1,a} := N^s_{1,a} + \tag{17}$$
$$\frac{1}{\lambda_1}\left(d_{\phi_1,a} - d^s_{\phi_1} + \frac{\gamma_1 + \gamma_2}{\gamma_1 - \gamma_2}\left(d_{p_1,a} - d^s_{p_1}\right) - \frac{2\gamma_1}{\gamma_1 - \gamma_2}\left(d_{p_2,a} - d^s_{p_2}\right)\right)$$

$$a^s_{2,a} := N^s_{2,a} + \tag{18}$$
$$\frac{1}{\lambda_2}\left(d_{\phi_2,a} - d^s_{\phi_2} + \frac{2\gamma_2}{\gamma_1 - \gamma_2}\left(d_{p_1,a} - d^s_{p_1}\right) - \frac{\gamma_1 + \gamma_2}{\gamma_1 - \gamma_2}\left(d_{p_2,a} - d^s_{p_2}\right)\right)$$

wherein:

$N^s_{i,a}$ are integer ambiguities;

$d_{\bullet,a}$ are receiver-related hardware delays;

$d^s_\bullet$ are satellite-related hardware delays.

Notice that the hardware delay terms contain not only the receiver and satellite phase hardware delay but also the receiver and satellite code hardware delay. The left hand side in the first equation directly above is computed as follows:

$$\delta\tilde{\phi}^s_{i,a} = \delta\phi^s_{i,a} + \tilde{b}^s \tag{19}$$

$\delta\tilde{\phi}^s_{i,a}$ are calculated from carrier phase observation $\phi^s_{i,a}$, the distance between the precise satellite position and the station $R^s_a$ and the precise clock offset $\tilde{b}^s$.

Then the functional model for n satellites can be written as follows:

$$\begin{bmatrix} P_{1,a} \\ P_{2,a} \\ \Phi_{1,a} \\ \Phi_{2,a} \end{bmatrix} = \begin{bmatrix} M_a & e_n & \gamma_1 I_n & & \\ M_a & e_n & \gamma_2 I_n & & \\ M_a & e_n & -\gamma_1 I_n & \lambda_1 I_n & \\ M_a & e_n & -\gamma_2 I_n & & \lambda_2 I_n \end{bmatrix} \begin{bmatrix} T_a \\ t_a \\ I_a \\ A_{1,a,zd} \\ A_{2,a,zd} \end{bmatrix} \tag{20}$$

where $$P_{i,a} := (\delta\tilde{p}^1_{i,a} \quad \delta\tilde{p}^2_{i,a} \quad \cdots \quad \delta\tilde{p}^n_{i,a})^T$$

$$\Phi_{i,a} := (\delta\tilde{\phi}^1_{i,a} \quad \delta\tilde{\phi}^2_{i,a} \quad \cdots \quad \delta\tilde{\phi}^n_{i,a})^T$$

$$M_a := (m^1_a \quad m^2_a \quad \cdots \quad m^n_a)^T$$

$$e_n := (1 \quad 1 \quad \cdots \quad 1)^T$$

$$I_a := (\tilde{I}^1_a \quad \tilde{I}^2_a \quad \cdots \quad \tilde{I}^n_a)^T$$

$$A_{i,a,zd} := (a^1_{i,a} \quad a^2_{i,a} \quad \cdots \quad a^n_{i,a})^T$$

$I_n$ is the identity matrix with 1 being the diagonal elements. Although it is possible to select a reference satellite, it is not a prerequisite.

According to the present invention embodiments, the PPP-IAR corrections A are calculated using the above described functional models. These corrections can then be transmitted to a mobile station 30, which then applies the corrections A to fix integer ambiguities, and/or to improve the convergence time. As an option for those mobiles being nearby the reference stations, the PPP-IAR corrections which are transmitted may also comprise the tropospheric delay term $T_a$, and/or the ionospheric delay term $\tilde{I}_a$. This embodiment allows a faster convergence at the mobile station 30, as these parameters allow constraining the ionospheric and tropospheric effects at the mobile station 30. In other words, the time needed to reliably resolve the ambiguities at the mobile station 30 takes less time when using the ionospheric and tropospheric corrections. The present invention embodiments however are not limited to applications using a small network, such as disclosed in the published patent application PCT/NL2013/050747. Instead, the present invention embodiments may be extended to applications covering a much larger region, even to the global scale.

Merging of PPP-IAR Corrections from a Network of Reference Stations

A single site or a small network of PPP-IAR corrections may limit its use, as mobiles far away from the network may have fewer common satellites. The present invention embodiments further relate to method to merge the PPP-IAR corrections from all individual reference stations into one single set of corrections. The reference stations forming a network may be 15-20 in number, e.g. for cross continent applications, or even 70-100 in global applications.

Step 1: Single-difference between satellites for PPP-IAR corrections of each reference station. In this way, the receiver hardware delay is eliminated.

$$a_{1,a}^{s,n} := a_{1,a}^s - a_{1,a}^n \qquad (21)$$
$$= N_{1,a}^{s,n} - \frac{1}{\lambda_1}\left(d_{\phi_1}^{s,n} + \frac{\gamma_1 + \gamma_2}{\gamma_1 - \gamma_2}d_{p_1}^{s,n} - \frac{2\gamma_1}{\gamma_1 - \gamma_2}d_{p_2}^{s,n}\right)$$

$$a_{2,a}^{s,n} := a_{2,a}^s - a_{2,a}^n \qquad (22)$$
$$= N_{2,a}^{s,n} - \frac{1}{\lambda_2}\left(d_{\phi_2}^{s,n} + \frac{2\gamma_2}{\gamma_1 - \gamma_2}d_{p_1}^{s,n} - \frac{\gamma_1 + \gamma_2}{\gamma_1 - \gamma_2}d_{p_2}^{s,n}\right)$$

where $d_\bullet^{s,n} = d_\bullet^s - d_\bullet^n$, $\bullet$ stands for $\phi_1$, $\phi_2$, $p_1$, $p_2$, n is assumed as the reference satellite, which must be different from s.

Step 2: Derive wide-lane and ionosphere-free combinations on the basis of single-difference L1 and L2 corrections.

$$a_{wl,a}^{s,n} = a_{1,a}^{s,n} - a_{2,a}^{s,n} \qquad (23)$$

$$a_{if,a}^{s,n} = \frac{f_1 \cdot a_{1,a}^{s,n} - f_2 \cdot a_{2,a}^{s,n}}{f_1 - f_2} \qquad (24)$$

Step 3: Merging of WL hardware delays. The step includes: 1) separating of the WL hardware delay from the WL integer ambiguities for all single-difference WL combinations of all reference stations, $$b_{wl,a}^{s,n} := a_{wl,a}^{s,n} - \lfloor a_{wl,a}^{s,n} \rceil \qquad (25)$$

where $\lfloor \bullet \rceil$ stands for rounding to the nearest integer; 2) computation of the single-difference WL of each pair of satellites the WL hardware delays of all reference stations, $$b_{wl}^{s,n} := \langle b_{wl,j}^{s,n} \rangle \qquad (26)$$

where j=a, b, . . . stands for all stations that have the WL values being used in the least-square computation, $\langle \bullet \rangle$ stands for the least-squares operation. The WL hardware delay is not station dependent any more.

Assuming the integers are properly separated, the single-difference WL hardware delay is written as follows:

$$b_{wl}^{s,n} = -\frac{1}{\lambda_1}d_{\phi_1}^{s,n} + \frac{1}{\lambda_2}d_{\phi_2}^{s,n} + \frac{\lambda_3}{\lambda_5}\left(\frac{1}{\lambda_1}d_{p_1}^{s,n} + \frac{1}{\lambda_2}d_{p_2}^{s,n}\right) \qquad (27)$$

3) transformation of all single-difference WL referred to a common reference satellite;
4) transformation of single-difference WL hardware delay to un-difference (UD) WL hardware delay by assigning an arbitrary value to the reference satellite, therefore we have UD WL hardware delay for each satellite $b_{wl}^1$, $b_{wl}^2$, ..., $b_{wl}^n$.

Step 4: Derivation and merging of L1 or L2 or narrowlane (NL) hardware delays. The present invention in this step starts to compute a double-difference WL float ambiguity using the derived UD WL hardware delay and previously computed single-difference WL combinations of all reference stations.

$$a_{wl,a}^{s,n} - (b_{wl}^s - b_{wl}^n) \qquad (28)$$

Then, the method provides to fix their integer ambiguities using e.g. the LAMBDA method, or bootstrapping or rounding to the nearest integers.

$$N_{wl,a}^{s,n} := \lfloor a_{wl,a}^{s,n} - (b_{wl}^s - b_{wl}^n) \rceil \qquad (29)$$

The difference between the float double-difference WL float ambiguity and its integer can be written as $$c_{wl,a}^{s,n} := a_{wl,a}^{s,n} - (b_{wl}^s - b_{wl}^n) - N_{wl,a}^{s,n} \qquad (30)$$

On the basis of above derivations, the L1 hardware delay can be corrected by using the difference between the float double-difference WL float ambiguity and its integer $$\hat{a}_{1,a}^{s,n} := \hat{a}_{1,a}^{s,n} + \frac{f_2}{f_1 - f_2}c_{wl,a}^{s,n} \qquad (31)$$

Alternatively, the same can be done for L2 hardware delay $$\hat{a}_{2,a}^{s,n} := \hat{a}_{2,a}^{s,n} + \frac{f_2}{f_1 - f_2}c_{wl,a}^{s,n} \qquad (32)$$

Another alternative, the NL hardware delay can be derived using the ionosphere-free combinations and the WL integer ambiguities $$a_{nl,a}^{s,n} := a_{if,a}^{s,n} - \frac{f_2}{f_1 - f_2}N_{wl,a}^{s,n} \qquad (33)$$

With the derived either $\hat{a}_{1,a}^{s,n}$ or $\hat{a}_{2,a}^{s,n}$ or $a_{nl,a}^{s,n}$, the same procedure of Step 3 can be followed to derive Single Difference (SD) L1 or L2 or NL hardware delays for each satellite. Assuming the integers are properly separated, the single-difference L1 hardware delay is written as follows:

$$b_1^{s,n} = -\frac{1}{\lambda_1}\left(d_{\phi_1}^{s,n} + \frac{\gamma_1 + \gamma_2}{\gamma_1 - \gamma_2}d_{p_1}^{s,n} - \frac{2\gamma_1}{\gamma_1 - \gamma_2}d_{p_2}^{s,n}\right) \qquad (34)$$

Or, the L2 hardware delay may be written as $$b_2^{s,n} = -\frac{1}{\lambda_2}\left(d_{\phi_2}^{s,n} + \frac{2\gamma_2}{\gamma_1 - \gamma_2}d_{p_1}^{s,n} - \frac{\gamma_1 + \gamma_2}{\gamma_1 - \gamma_2}d_{p_2}^{s,n}\right) \qquad (35)$$

Or, the single-difference NL hardware delay is written as follows:

$$b_{nl}^{s,n} = \frac{1}{\lambda_3}(d_{P_3}^{s,n} - d_{\phi_3}^{s,n}) \quad (36)$$

Transform single-difference L1 or L2 or NL hardware delay to un-difference (UD) L1 or L2 or NL hardware delay by assigning an arbitrary value to (i.e. a datum) the reference satellite, Therefore, we have $b_1^1, b_1^2, \ldots, b_1^n$ or $b_2^1, b_2^2, \ldots, b_2^n$ or $b_{nl}^1, b_{nl}^2, \ldots, b_{nl}^n$.

Step 5: Transformation of WL and NL/L1 to L1 and L2 hardware delays. If the WL and L1 hardware delays are available, the L2 hardware delay can be derived as follows:

$$b_2^s = b_1^s - b_{wl}^s \quad (37)$$
$$= -\frac{1}{\lambda_2}\left(d_{\phi_2}^s + \frac{2\gamma_2}{\gamma_1 - \gamma_2}d_{P_1}^s - \frac{\gamma_1 + \gamma_2}{\gamma_1 - \gamma_2}d_{P_2}^s\right) - D_2$$

If the WL and L2 hardware delays are available, the L2 hardware delay can be derived as follows:

$$b_1^s = b_2^s - b_{wl}^s \quad (38)$$
$$= -\frac{1}{\lambda_1}\left(d_{\phi_1}^s + \frac{\gamma_1 + \gamma_2}{\gamma_1 - \gamma_2}d_{P_1}^s - \frac{2\gamma_1}{\gamma_1 - \gamma_2}d_{P_2}^s\right) - D_1$$

If the WL and NL hardware delays are available, the L1 and L2 hardware delays can be derived as follows:

$$b_1^s = b_{nl}^s - \frac{f_2}{f_1 - f_2}b_{wl}^s \quad (39)$$
$$= -\frac{1}{\lambda_1}\left(d_{\phi_1}^s + \frac{\gamma_1 + \gamma_2}{\gamma_1 - \gamma_2}d_{P_1}^s - \frac{2\gamma_1}{\gamma_1 - \gamma_2}d_{P_2}^s\right) - D_1$$

$$b_2^s = b_{nl}^s - \frac{f_2}{f_1 - f_2}b_{wl}^s \quad (40)$$
$$= -\frac{1}{\lambda_2}\left(d_{\phi_2}^s + \frac{2\gamma_2}{\gamma_1 - \gamma_2}d_{P_1}^s - \frac{\gamma_1 + \gamma_2}{\gamma_1 - \gamma_2}d_{P_2}^s\right) - D_2$$

where, $D_1$ and $D_2$ are the datums used for merged L1 and L2 hardware delay. It is equivalent to derive either L1, or L2 or NL hardware delay in Step 4. So far, $b_1^1, b_1^2, \ldots, b_1^n$ and $b_2^1, b_2^2, \ldots, b_2^n$ are the final results of merged PPP-IAR corrections that can be broadcasted to mobiles. The present invention embodiments provide an option not to broadcast $b_1^1, b_1^2, \ldots, b_1^n$ and $b_2^1, b_2^2, \ldots, b_2^n$, but to broadcast $b_1^1, b_1^2, \ldots, b_1^n$ and $b_{wl}^1, b_{wl}^2, \ldots, n_{wl}^n$, or to broadcast $b_{nl}^1, b_{nl}^2, \ldots, b_{nl}^n$ and $b_{wl}^1, b_{wl}^2, \ldots, b_{wl}^n$.

Transmission of Merged PPP-IAR Corrections to Mobiles

The present invention embodiments provide a method and system to broadcast the merged PPP-IAR corrections at mobiles. The merged PPP-IAR corrections comprise only the fractional parts of the hardware delay. The system can optionally broadcast L1 and L2 corrections, or NL and WL corrections, or L1 and WL corrections. Of them, WL and NL corrections are more stable than L1 and L2 corrections, so that the interval of broadcast can be sparse for saving bandwidth.

Applying of the Merged PPP-IAR Corrections and Position Determination of Mobile

The present invention embodiments provide a method and system to apply the merged PPP-IAR corrections in mobiles. It is assumed that the PPP-IAR corrections are properly received, decoded and transformed to $b_1^1, b_1^2, \ldots, b_1^n$ and $b_2^1, b_2^2, \ldots, b_2^n$.

The present invention embodiments make use of the same functional model in the mobile side. Since the coordinates of mobile is unknown, the measurement model can be written as:

$$\delta\tilde{p}_{i,r}^s = \mu_r^s \Delta x_r + m_r^s T_r + t_r + \gamma_i \tilde{I}_r^s \quad (41)$$

$$\delta\tilde{\phi}_{i,r}^s = \mu_r^s \Delta x_r + m_r^s T_r + t_r - \gamma_i \tilde{I}_r^s + \lambda_i a_{i,r}^s \quad (42)$$

where $\mu_r^s$ is the unit vector of line-of-sight between the mobile receiver r and satellite s; $\delta\tilde{p}_{i,r}^s = p_{i,r}^s - R_r^s + \tilde{b}^s$, and $\delta\tilde{\phi}_{i,r}^s - R_r^s + \tilde{b}^s$, where $R_r^s$ is computed using precise orbit and a priori coordinates of receiver r, $\tilde{b}^s$ is the precise clock; $\Delta x_r$ the correction to the a priori position. The remaining parameters are the same as in Eq. (12-13) and Eq. (17-18), except that the receiver index a is changed to r.

The present invention embodiments use a reference satellite in the mobile to eliminate receiver hardware delays. Selecting satellite n as reference in this case, the functional model of the mobile is written as:

$$\begin{bmatrix} P_{1,r} \\ P_{2,r} \\ \Phi_{1,r} \\ \Phi_{2,r} \end{bmatrix} = \begin{bmatrix} \mu_r & M_r & e_n & & \gamma_1 E_{n\times(n-1)} & & \\ \mu_r & M_r & & e_n & \gamma_2 E_{n\times(n-1)} & & \\ \mu_r & M_r & e_n & & -\gamma_1 E_{n\times(n-1)} & \lambda_1 E_{n\times(n-1)} & \\ \mu_r & M_r & & e_n & -\gamma_2 E_{n\times(n-1)} & & \lambda_2 E_{n\times(n-1)} \end{bmatrix} \begin{bmatrix} \Delta x_r \\ T_r \\ t_{P_1,r} \\ t_{P_2,r} \\ t_{\phi_1,r} \\ t_{\phi_2,r} \\ I_{r,sd} \\ A_{1,a,sd} \\ A_{2,a,sd} \end{bmatrix} \quad (43)$$

-continued $$\mu_r := (\mu_r^1 \ \mu_r^2 \ \cdots \ \mu_r^n)$$

$$t_{P_1,r} := t_r + \gamma_1 \bar{I}_r^n$$

$$t_{P_2,r} := t_r + \gamma_2 \bar{I}_r^n$$

$$t_{\phi_1,r} := t_r - \gamma_1 \bar{I}_r^n + d_{1,r}^n$$

$$t_{\phi_2,r} := t_r - \gamma_2 \bar{I}_r^n + d_{2,r}^n$$

$$I_{r,sd} := \left( \bar{I}_r^{1,n} \ \bar{I}_r^{2,n} \ \cdots \ \bar{I}_r^{n-1,n} \right)^T$$

$$A_{i,r,sd} := \left( a_{i,r}^{1,n} \ a_{i,r}^{2,n} \ \cdots \ a_{i,r}^{n-1,n} \right)^T$$

$$E_{n \times (n-1)} := \begin{pmatrix} I_{n-1} \\ 0_{n-1}^T \end{pmatrix} = \begin{pmatrix} 1 & & \\ & \ddots & \\ & & 1 \\ 0 & \cdots & 0 \end{pmatrix}$$

where $$\bar{I}_r^{s,n} := I_r^s - I_r^n = I_r^s - I_r^n + \frac{\gamma_1}{\gamma_1 - \gamma_2} \left( -d_{p_1}^s + d_{p_1}^n + d_{p_2}^s - d_{p_2}^n \right) \quad (45)$$

and $$a_{1,r}^{s,n} := a_{1,r}^s - a_{1,r}^n = N_{1,r}^{s,n} - \frac{1}{\lambda_1} \left( d_{\phi_1}^{s,n} + \frac{\gamma_1 + \gamma_2}{\gamma_1 - \gamma_2} d_{p_1}^{s,n} - \frac{2\gamma_1}{\gamma_1 - \gamma_2} d_{p_2}^{s,n} \right) \quad (46)$$

$$a_{2,r}^{s,n} := a_{2,r}^s - a_{2,r}^n = N_{2,r}^{s,n} - \frac{1}{\lambda_2} \left( d_{\phi_2}^{s,n} + \frac{2\gamma_2}{\gamma_1 - \gamma_2} d_{p_1}^{s,n} - \frac{\gamma_1 + \gamma_2}{\gamma_1 - \gamma_2} d_{p_2}^{s,n} \right) \quad (47)$$

The functional model can be written in a simplified way. Assuming $$y := \begin{bmatrix} P_{1,r} \\ P_{2,r} \\ \Phi_{1,r} \\ \Phi_{2,r} \end{bmatrix}, A := \begin{bmatrix} & & \\ & & \\ \lambda_1 E_{n \times (n-1)} & \\ & \lambda_2 E_{n \times (n-1)} \end{bmatrix},$$

$$B := \begin{bmatrix} \mu_r & M_r & e_n & & & \gamma_1 E_{n \times (n-1)} \\ \mu_r & M_r & & e_n & & \gamma_2 E_{n \times (n-1)} \\ \mu_r & M_r & & & e_n & -\gamma_1 E_{n \times (n-1)} \\ \mu_r & M_r & & & e_n & -\gamma_2 E_{n \times (n-1)} \end{bmatrix},$$

$$a := \begin{bmatrix} A_{1,r,sd} \\ A_{2,r,sd} \end{bmatrix}, b := \begin{bmatrix} \Delta x_r \\ T_r \\ t_{P_1,r} \\ t_{P_2,r} \\ t_{\phi_1,r} \\ t_{\phi_2,r} \\ I_{r,sd} \end{bmatrix}$$

Therefore, we have the functional model, together with the stochastic model as follows:

$$E\{y\} = (A \ B) \begin{pmatrix} a \\ b \end{pmatrix} \quad D\{y\} = Q_y \quad (48)$$

where, $Q_y$ the covariance matrix of y, $E\{\cdot\}$ and $D\{\cdot\}$ denote expectation and dispersion, respectively. The standard least-square solution is implemented on the basis Of Eq. (45), $$\begin{pmatrix} A^T Q_y^{-1} A & A^T Q_y^{-1} B \\ B^T Q_y^{-1} A & B^T Q_y^{-1} B \end{pmatrix} \begin{pmatrix} a \\ b \end{pmatrix} = \begin{pmatrix} A^T Q_y^{-1} y \\ B^T Q_y^{-1} y \end{pmatrix} \quad (49)$$

The ambiguity float solution is given by $$\begin{pmatrix} \hat{a} \\ \hat{b} \end{pmatrix} = \begin{pmatrix} Q_{\hat{a}\hat{a}} & Q_{\hat{a}\hat{b}} \\ Q_{\hat{b}\hat{a}} & Q_{\hat{b}\hat{b}} \end{pmatrix} \begin{pmatrix} A^T Q_y^{-1} y \\ B^T Q_y^{-1} y \end{pmatrix} \quad (50)$$

The present invention embodiments provide a method to apply the PPP-IAR corrections $A_{i,sd}$ to the phase observations, $$y := \begin{bmatrix} P_{1,r} \\ P_{2,r} \\ \Phi_{1,r} - \lambda_1 E_{n \times (n-1)} A_{1,sd} \\ \Phi_{2,r} - \lambda_2 E_{n \times (n-1)} A_{2,sd} \end{bmatrix} \quad (51)$$

The ambiguity parameters are then changed to $$a := \begin{bmatrix} N_{1,r} \\ N_{2,r} \end{bmatrix} \quad (52)$$

where $N_{i,r} = A_{i,r,sd} - A_{i,sd} = (N_{i,r}^{1,n} \ N_{i,r}^{2,n} \ \cdots \ N_{i,r}^{n-1,n})^T$ in which, the hardware delays are removed. The ambiguity term in the mobile has an integer nature, which meets the requirement to trigger an integer-fixing scheme, e.g. the LAMBDA method. The fixing scheme is applied to $\hat{a}$ and $Q_{ăă}$, resulting in integer ambiguities ă. The ambiguity fixed solution of the remaining parameters is then given by $$\check{b} = \hat{b} - Q_{\hat{b}\hat{a}} Q_{\hat{a}\hat{a}}^{-1}(\hat{a} - \check{a}) \quad (53)$$

The present invention embodiments provide an alternative method to apply the PPP-IAR corrections. Instead of observations, the estimated float ambiguities are directly corrected by the PPP-IAR corrections, resulting in $$\hat{a}' = \hat{a} - A$$

wherein, A is the vector of PPP-IAR corrections. The fixing scheme is applied to $\hat{a}'$ and $Q_{\hat{a}\hat{a}}$, resulting in integer ambiguities ă'. The ambiguity fixed solution of the rest parameters is then given by $$\check{b} = \hat{b} - Q_{\hat{b}\hat{a}} Q_{\hat{a}\hat{a}}^{-1}(\hat{a}' - \check{a}') \quad (54)$$

Applying the PPP-IAR corrections to the float ambiguities has several advantages: The float solutions is not affected by jumps or resets in the PPP-IAR corrections. The PPP-IAR corrections do not have to be transferred between epochs, and the size of the corrections can always be reduced to a value between zero and one.

What is claimed is:

1. A method for providing Precise Point Positioning-Integer Ambiguity Resolution (PPP-IAR) corrections for a global navigation satellite system (GNSS), the method comprising:
calculating, by a processor, PPP-IAR corrections based on observation data $P_{i,a}$, $\Phi_{i,a}$ for n satellites received at one or more reference stations with known locations, using a functional model, the functional model being defined as:

$$\begin{bmatrix} P_{1,a} \\ P_{2,a} \\ \Phi_{1,a} \\ \Phi_{2,a} \end{bmatrix} = \begin{bmatrix} M_a & e_n & \gamma_1 I_n & & \\ M_a & e_n & \gamma_2 I_n & & \\ M_a & e_n & -\gamma_1 I_n & \lambda_1 I_n & \\ M_a & e_n & -\gamma_2 I_n & & \lambda_2 I_n \end{bmatrix} \begin{bmatrix} T_a \\ t_a \\ I_a \\ A_{1,a,zd} \\ A_{2,a,zd} \end{bmatrix},$$

wherein,
$P_{i,a}$, $\Phi_{i,a}$ is observation data at reference station a of the one or more reference stations,
a state vector including a zenith tropospheric delay term $T_a$,
$t_a$ is a clock bias term,
$I_a$ is an ionospheric delay term,
A is a set of hardware delay terms,
$M_a$ is a vector comprising tropospheric mapping function values between the reference station a and each of the n satellites,
$\gamma_i = f_1^2/f_i^2$, $f_i$ being the carrier frequency,
$\lambda_i$ is the carrier wavelength ($\lambda_i = c/f_i$, c being the speed of light),
$e_n$ is an n-unity vector with all ones as its elements,
$I_n$ is an identity matrix with 1 being the diagonal elements,
the hardware delay terms are $A_{i,a,zd} := (a_{i,a}^1 \, a_{i,a}^2 \ldots a_{i,a}^n)^T$ and $$a_{1,a}^s :=$$
$$N_{1,a}^s + \frac{1}{\lambda_1}\left(d_{\phi_1,a} - d_{\phi_1}^s + \frac{\gamma_1 + \gamma_2}{\gamma_1 - \gamma_2}(d_{P_1,a} - d_{P_1}^s) - \frac{2\gamma_1}{\gamma_1 - \gamma_2}(d_{P_2,a} - d_{P_2}^s)\right)$$

$$a_{2,a}^s := N_{2,a}^s +$$

-continued
$$\frac{1}{\lambda_2}\left(d_{\phi_2,a} - d_{\phi_2}^s + \frac{2\gamma_2}{\gamma_1 - \gamma_2}(d_{P_1,a} - d_{P_1}^s) - \frac{\gamma_1 + \gamma_2}{\gamma_1 - \gamma_2}(d_{P_2,a} - d_{P_2}^s)\right),$$

$N_{i,a}^s$ are integer ambiguities at reference station a to satellite s,
$d_{P_i,a}$ are code hardware delays for reference station a,
$d_{\Phi_i,a}$ are phase hardware delays for reference station a,
$d_{P_i}^s$ are code hardware delays for satellite s, and
$d_{\Phi_i}^s$ are phase hardware delays for satellite s, and
transmitting the PPP-IAR corrections including the hardware delay terms A to a mobile station.

2. The method according to claim 1, further comprising
deriving satellite-satellite single-differenced PPP-IAR corrections from individual reference stations;
deriving geometry-based wide-lane (WL) hardware delays and ionosphere-free combination of satellite-satellite single-differenced PPP-IAR corrections;
merging of WL hardware delays;
deriving and merging of L1, or L2 or narrow-lane (NL) hardware delays;
transforming WL hardware delays and L1, L2 or NL hardware delays to L1 and L2 hardware delays.

3. The method according to claim 2, wherein the geometry-based WL is calculated by $a_{wl,a}^{s,n} = a_{1,a}^{s,n} - a_{2,a}^{s,n}$, the WL hardware delays are separated from the nearest integers by $b_{wl,a}^{s,n} := a_{wl,a}^{s,n} - \lfloor a_{wl,a}^{s,n} \rceil$ and the WL hardware delays of all reference stations are used to compute site-independent WL hardware delays using $b_{wl}^{s,n} := \langle b_{wl,j}^{s,n} \rangle$.

4. The method according to claim 2, wherein the L1 and L2 hardware delay is corrected using the difference between the float double-difference WL float ambiguity and its integer, according to $$\hat{a}_{1,a}^{s,n} := a_{1,a}^{s,n} + \frac{f_1}{f_1 - f_2} c_{wl,a}^{s,n} \text{ and } \hat{a}_{2,a}^{s,n} := a_{2,a}^{s,n} + \frac{f_1}{f_1 - f_2} c_{wl,a}^{s,n},$$

wherein $$c_{wl,a}^{s,n} := a_{wl,a}^{s,n} - (b_{wl}^s - b_{wl}^n) - N_{wl,a}^{s,n} \text{ and } N_{wl,a}^{s,n} := [a_{wl,a}^{s,n} - (b_{wl}^s - b_{wl}^n)].$$

5. The method according to claim 2, wherein the NL hardware delay is derived using the ionosphere-free combinations and the WL integer ambiguities:

$$a_{nl,a}^{s,n} := a_{if,a}^{s,n} - \frac{f_2}{f_1 - f_2} N_{wl,a}^{s,n} \text{ wherein } a_{if,a}^{s,n} = \frac{f_1 \cdot a_{1,a}^{s,n} - f_2 \cdot a_{2,a}^{s,n}}{f_1 - f_2}.$$

6. The method according to claim 2, wherein the PPP-IAR corrections for broadcast to the mobile station comprise:
the L1 and L2 hardware delays; or
the WL and L1 hardware delays; or
the WL and NL hardware delays.

7. A method for applying Precise Point Positioning - Integer Ambiguity Resolution (PPP-IAR) corrections and position determination of a mobile station r, the method comprising:
receiving, by one or more processors, PPP-IAR corrections from a global navigation satellite system (GNSS) signal correction system, the PPP-IAR corrections including hardware delay terms A;
acquiring, at the one or more processors, GNSS data including pseudo range mobile observations and carrier phase mobile observations from a plurality of GNSS satellites;

applying, by the one or more processors, the PPP-IAR corrections to a functional model, the functional model being defined as:

$$\begin{bmatrix} P_{1,r} \\ P_{2,r} \\ \Phi_{1,r} \\ \Phi_{2,r} \end{bmatrix} = \begin{bmatrix} \mu_r & M_r & e_n & & & & \gamma_1 E_{n\times(n-1)} & & \\ \mu_r & M_r & & e_n & & & \gamma_2 E_{n\times(n-1)} & & \\ \mu_r & M_r & & & e_n & & -\gamma_1 E_{n\times(n-1)} & \lambda_1 E_{n\times(n-1)} & \\ \mu_r & M_r & & & & e_n & -\gamma_2 E_{n\times(n-1)} & & \lambda_2 E_{n\times(n-1)} \end{bmatrix} \begin{bmatrix} \Delta x_r \\ T_r \\ t_{p_1,r} \\ t_{p_2,r} \\ t_{\phi_1,r} \\ t_{\phi_2,r} \\ I_{r,sd} \\ A_{1,r,sd} \\ A_{2,r,sd} \end{bmatrix}$$

wherein, $P_{i,r}$, $\Phi_{i,r}$ is observation data at the mobile station r, a state vector comprising an a priori position correction $\Delta x$, $T_r$ is a zenith tropospheric delay term, $t_{p1,r}$, $t_{p2,r}$, $t_{\Phi1,r}$, $t_{\Phi2,r}$ are clock bias terms, $I_r$ is ionospheric delay terms, $M_r$ is a vector comprising tropospheric mapping function values between the mobile station r and each of the n satellites, $\gamma_i = f_1^2/f_i^2$, $f_i$ being the carrier frequency, $\lambda_i$ is the carrier wavelength ($\lambda_i = c/f_i$, c being the speed of light), $e_n$ is an n-unity vector with all ones as its elements, $$\mu_r := (\mu_r^1 \quad \mu_r^2 \quad \ldots \quad \mu_r^n)^T$$

$$t_{p_1,r} := t_r + \gamma_1 \tilde{I}_r^n$$

$$t_{p_2,r} := t_r + \gamma_2 \tilde{I}_r^n$$

$$t_{\phi_1,r} := t_r - \gamma_1 \tilde{I}_r^n + d_{1,r}^n$$

$$t_{\phi_2,r} := t_r - \gamma_2 \tilde{I}_r^n + d_{2,r}^n$$

$$I_{r,sd} := (\tilde{I}_r^{1,n} \quad \tilde{I}_r^{2,n} \quad \ldots \quad \tilde{I}_r^{n-1,n})^T$$

$$A_{i,r,sd} := (a_{i,r}^{1,n} \quad a_{i,r}^{2,n} \quad \ldots \quad a_{i,r}^{n-1,n})^T$$

$$E_{n\times(n-1)} := \begin{pmatrix} I_{n-1} \\ 0_{n-1}^T \end{pmatrix} = \begin{pmatrix} 1 & & & \\ & \ddots & & \\ & & & 1 \\ 0 & \ldots & & 0 \end{pmatrix},$$

$\mu_r^s$ is the unit vector of line-of-sight between the mobile station r and satellite s $$a_{1,r}^s :=$$
$$N_{1,r}^s + \frac{1}{\lambda_1}\left(d_{\phi_1,r} - d_{\phi_1}^s + \frac{\gamma_1 + \gamma_2}{\gamma_1 - \gamma_2}(d_{p_1,r} - d_{p_1}^s) - \frac{2\gamma_1}{\gamma_1 - \gamma_2}(d_{p_2,r} - d_{p_2}^s)\right)$$

$$a_{2,r}^s := N_{2,r}^s +$$
$$\frac{1}{\lambda_2}\left(d_{\phi_2,r} - d_{\phi_2}^s + \frac{2\gamma_1}{\gamma_1 - \gamma_2}(d_{p_1,r} - d_{p_1}^s) - \frac{\gamma_1 + \gamma_2}{\gamma_1 - \gamma_2}(d_{p_2,r} - d_{p_2}^s)\right)$$

$$\tilde{I}_r^{s,n} := \tilde{I}_r^s - \tilde{I}_r^n = I_r^s - I_r^n + \frac{\gamma_1}{\gamma_1 - \gamma_2}(-d_{p_1}^s + d_{p_1}^n + d_{p_2}^s - d_{p_2}^n)$$

$$a_{1,r}^{s,n} := a_{1,r}^s - a_{1,r}^n = N_{1,r}^{s,n} - \frac{1}{\lambda_1}\left(d_{\phi_1}^{s,n} + \frac{\gamma_1 + \gamma_2}{\gamma_1 - \gamma_2} d_{p_1}^{s,n} - \frac{2\gamma_1}{\gamma_1 - \gamma_2} d_{p_2}^{s,n}\right)$$

-continued $$a_{2,r}^{s,n} := a_{2,r}^s - a_{2,r}^n = N_{2,r}^{s,n} - \frac{1}{\lambda_2}\left(d_{\phi_2}^{s,n} + \frac{2\gamma_2}{\gamma_1 - \gamma_2} d_{p_1}^{s,n} - \frac{\gamma_1 + \gamma_2}{\gamma_1 - \gamma_2} d_{p_2}^{s,n}\right),$$

and $N_{i,r}^s$ are integer ambiguities for mobile station r to satellite s, $N_{i,r}^{s,n}$ are satellite-differenced integer ambiguities for mobile station r and between satellite s and reference satellite n, $d_{p_i,r}$ are code hardware delays for mobile station r, $d_{\Phi_i,r}$ are phase hardware delays for mobile station r, $d_{p_i}^s$ are code hardware delays for satellite s, $d_{\Phi_i}^s$ are phase hardware delays for satellite, $d_{p_i}^{s,n}$ are satellite-differenced code hardware delays between satellite s and reference satellite n, and $d_{\Phi_i}^{s,n}$ are satellite-differenced phase hardware delays between satellite s and reference satellite n and wherein the PPP-IAR corrections are applied to the functional model.

8. The method according to claim 7, wherein the functional model is augmented with a stochastic model according to $$E\{y\} = (A \quad B)\begin{pmatrix} a \\ b \end{pmatrix}$$

$$D\{y\} = Q_y$$

wherein $Q_y$ is the covariance matrix of y, $E\{\bullet\}$ and $D\{\bullet\}$ denote expectation and dispersion, respectively, and $$y := \begin{bmatrix} P_{1,r} \\ P_{2,r} \\ \Phi_{1,r} \\ \Phi_{2,r} \end{bmatrix}, A := \begin{bmatrix} & & \\ & & \\ \lambda_1 E_{n\times(n-1)} & \\ & \lambda_2 E_{n\times(n-1)} \end{bmatrix},$$

$$B := \begin{bmatrix} \mu_r & M_r & e_n & & & & \gamma_1 E_{n\times(n-1)} \\ \mu_r & M_r & & e_n & & & \gamma_2 E_{n\times(n-1)} \\ \mu_r & M_r & & & e_n & & -\gamma_1 E_{n\times(n-1)} \\ \mu_r & M_r & & & & e_n & -\gamma_2 E_{n\times(n-1)} \end{bmatrix},$$

-continued $$a := \begin{bmatrix} A_{1,r,sd} \\ A_{2,r,sd} \end{bmatrix}, b := \begin{bmatrix} \Delta x_r \\ T_r \\ t_{P_1,r} \\ t_{P_2,r} \\ t_{\phi_1,r} \\ t_{\phi_2,r} \\ I_{r,sd} \end{bmatrix}$$

and a least squares solution is calculated accordingly.

9. The method according to claim 7, wherein the received PPP-IAR corrections are applied to the phase observations:

$$y := \begin{bmatrix} P_{1,r} \\ P_{2,r} \\ \Phi_{1,r} - \lambda_1 E_{n \times (n-1)} A_{1,sd} \\ \Phi_{2,r} - \lambda_2 E_{n \times (n-1)} A_{2,sd} \end{bmatrix},$$

and the ambiguity parameters are:

$$a := \begin{bmatrix} N_{1,r} \\ N_{2,r} \end{bmatrix}$$

wherein $N_{i,r} = A_{i,r,sd} - A_{i,sd} = (N_{i,r}^{1,n}\ N_{i,r}^{2,n}\ \ldots\ N_{i,r}^{n-1,n})^T$ and a solution is calculated using an integer-fixing scheme.

10. The method according to claim 7, wherein the received PPP-IAR corrections are alternatively applied to estimated float ambiguities, resulting in $$\hat{a}' = \hat{a} - A,$$

wherein A is the vector of PPP-IAR corrections, a fixing scheme is applied to â' and $Q_{\hat{a}\hat{a}}$, resulting in integer ambiguities ă', and an ambiguity fixed solution of the rest parameters is then given by $$\breve{a} = \hat{a} - Q_{\hat{b}\hat{a}} Q_{\hat{a}\hat{a}}^{-1}(\hat{a}' - \breve{a}').$$

11. A global navigation satellite system (GNSS) signal correction system for estimating and transmitting Precise Point Positioning-integer Ambiguity Resolution (PPP-IAR) corrections to a mobile station, the GNSS signal correction system comprising:

one or more reference stations including a GNSS receiver configured to acquire GNSS data including pseudo range system observations $P_a$ and carrier phase system observations $\Phi_a$ from a plurality of GNSS satellites transmitted over multiple epochs;

one or more processors, configured to receive the GNSS data from the multiple reference stations in real time, and calculate the PPP-IAR corrections based on observation data $P_{i,a}$, $\Phi_{i,a}$ for n satellites received at one or more reference stations with known locations, using a functional model, the functional model being defined as:

$$\begin{bmatrix} P_{1,a} \\ P_{2,a} \\ \Phi_{1,a} \\ \Phi_{2,a} \end{bmatrix} = \begin{bmatrix} M_a & e_n & \gamma_1 I_n & & \\ M_a & e_n & \gamma_2 I_n & & \\ M_a & e_n & -\gamma_1 I_n & \lambda_1 I_n & \\ M_a & e_n & -\gamma_2 I_n & & \lambda_2 I_n \end{bmatrix} \begin{bmatrix} T_a \\ t_a \\ I_a \\ A_{1,a,zd} \\ A_{2,a,zd} \end{bmatrix},$$

wherein $P_{i,a}$, $\Phi_{i,a}$ observation data at reference station a of the one or more reference stations, a state vector including a zenith tropospheric delay term $T_a$, $t_a$, is a clock bias term, $I_a$ is an ionospheric delay term, A is a set of hardware delay terms, $M_a$ is a vector comprising tropospheric mapping function values between the reference station a and each of the n satellites, $\gamma_i = f_1^2/f_i^2, f_i$ being the carrier frequency, $\lambda_i$ is the carrier wavelength ($\lambda_i = c/f_i$, c being the speed of light), $e_n$ is an n-unity vector with all ones as its elements, $I_n$ is an identity matrix with 1 being the diagonal elements, the hardware delay terms are $A_{i,a,zd} := (a_{i,a}^1\ a_{i,a}^2\ \ldots\ a_{i,a}^n)^T$ and $$a_{1,a}^s :=$$

$$N_{1,a}^s + \frac{1}{\lambda_1}\left(d_{\phi_1,a} - d_{\phi_1}^s + \frac{\gamma_1 + \gamma_2}{\gamma_1 - \gamma_2}(d_{P_1,a} - d_{P_1}^s) - \frac{2\gamma_1}{\gamma_1 - \gamma_2}(d_{P_2,a} - d_{P_2}^s)\right)$$

$$a_{2,a}^s := N_{2,a}^s +$$

$$\frac{1}{\lambda_2}\left(d_{\phi_2,a} - d_{\phi_2}^s + \frac{2\gamma_2}{\gamma_1 - \gamma_2}(d_{P_1,a} - d_{P_1}^s) - \frac{\gamma_1 + \gamma_2}{\gamma_1 - \gamma_2}(d_{P_2,a} - d_{P_2}^s)\right),$$

$N_{i,a}^s$ are integer ambiguities at reference station a to satellite s, $d_P^{i,a}$ are code hardware delays for reference station a, $d_{\Phi_i}^{,a}$ are phase hardware delays for reference station a, $d_{P_i}^s$ are code hardware delays for satellite s, and $d_{\Phi_i}^s$ are phase hardware delays for satellites;

a signal transmitter connected to the one or more processors configured to transmit the PPP-IAR corrections to the mobile station.

12. A mobile station, comprising:

a mobile global navigation satellite system (GNSS) receiver configured to acquire GNSS data including pseudo range mobile observations $P_r$ and carrier phase mobile observations $\Phi_r$ from a plurality of GNSS satellites transmitted over multiple epochs, a mobile signal receiver configured to receive GNSS corrections, a mobile processing unit connected to the mobile GNSS receiver and the mobile signal receiver, the mobile station is configured to:

receive Precise Point Positioning-Integer Ambiguity Resolution (PPP-IAR) corrections from a global navigation satellite system (GNSS) signal correction system, the PPP-IAR corrections including hardware delay terms A;

acquire GNSS data including pseudo range mobile observations and carrier phase mobile observations from the plurality of GNSS satellites;

apply the PPP-IAR, corrections to a functional model, the functional model being defined as:

$$\begin{bmatrix} P_{1,r} \\ P_{2,r} \\ \Phi_{1,r} \\ \Phi_{2,r} \end{bmatrix} = \begin{bmatrix} \mu_r & M_r & e_n & & \gamma_1 E_{n\times(n-1)} & \\ \mu_r & M_r & e_n & & \gamma_2 E_{n\times(n-1)} & \\ \mu_r & M_r & & e_n & -\gamma_1 E_{n\times(n-1)} & \gamma_1 E_{n\times(n-1)} \\ \mu_r & M_r & & e_n & -\gamma_2 E_{n\times(n-1)} & \gamma_2 E_{n\times(n-1)} \end{bmatrix}$$

$$\begin{bmatrix} \Delta x_r \\ T_r \\ t_{p_1,r} \\ t_{p_2,r} \\ t_{\phi_1,r} \\ t_{\phi_2,r} \\ I_{r,sd} \\ A_{1,r,sd} \\ A_{2,r,sd} \end{bmatrix}$$

wherein, $P_{i,r}$, $\Phi_{i,r}$ is observation data at the mobile station r, a state vector comprising an a priori position correction $\Delta x$, $T_r$ is a zenith tropospheric delay term, $t_{p1,r}$, $t_{p2,r}$, $t_{\phi1,r}$, $t_{\phi2,r}$ are dock bias terms, $I_r$ is ionospheric delay terms, $M_r$ is a vector comprising tropospheric mapping function values between the mobile station r and each of the n satellites, $\gamma_i = f_1^2/f_i^2$, $f_i$ being the carrier frequency, $\lambda_i$ is the carrier wavelength ($\lambda_i = c/f_i$, c being the speed of light), $e_n$ is an n-unity vector with all ones as its elements, $$\mu_r := (\mu_r^1 \ \mu_r^2 \ \ldots \ \mu_r^n)^T$$

$$t_{p_1,r} := t_r + \gamma_1 \tilde{I}_r^n$$

$$t_{p_2,r} := t_r + \gamma_2 \tilde{I}_r^n$$

$$t_{\phi_1,r} := t_r - \gamma_1 \tilde{I}_r^n + d_{1,r}^n$$

$$t_{\phi_2,r} := t_r - \gamma_2 \tilde{I}_r^n + d_{2,r}^n$$

$$I_{r,sd} := (\tilde{I}_r^{1,n} \ \tilde{I}_r^{2,n} \ \ldots \ \tilde{I}_r^{n-1,n})^T$$

$$A_{i,r,sd} := (a_{i,r}^{1,n} \ a_{i,r}^{2,n} \ \ldots \ a_{i,r}^{n-1,n})^T$$

$$E_{n\times(n-1)} := \begin{pmatrix} I_{n-1} \\ 0_{n-1}^T \end{pmatrix} = \begin{pmatrix} 1 & & & \\ & \ddots & & \\ & & & 1 \\ 0 & \ldots & & 0 \end{pmatrix},$$

$\mu_r^s$ the unit vector of line-of-sight between the mobile station r and satellite s $$a_{1,r}^s :=$$
$$N_{1,r}^s + \frac{1}{\lambda_1}\left(d_{\phi_1,r} - d_{\phi_1}^s + \frac{\gamma_1+\gamma_2}{\gamma_1-\gamma_2}(d_{p_1,r} - d_{p_1}^s) - \frac{2\gamma_1}{\gamma_1-\gamma_2}(d_{p_2,r} - d_{p_2}^s)\right)$$

$$a_{2,r}^s := N_{2,r}^s +$$
$$\frac{1}{\lambda_2}\left(d_{\phi_2,r} - d_{\phi_2}^s + \frac{2\gamma_1}{\gamma_1-\gamma_2}(d_{p_1,r} - d_{p_1}^s) - \frac{\gamma_1+\gamma_2}{\gamma_1-\gamma_2}(d_{p_2,r} - d_{p_2}^s)\right)$$

$$\tilde{I}_r^{s,n} := \tilde{I}_r^s - \tilde{I}_r^n = I_r^s - I_r^n + \frac{\gamma_1}{\gamma_1-\gamma_2}\left(-d_{p_1}^s + d_{p_1}^n + d_{p_2}^s - d_{p_2}^n\right)$$

-continued $$a_{1,r}^{s,n} := a_{1,r}^s - a_{1,r}^n = N_{1,r}^{s,n} - \frac{1}{\lambda_1}\left(d_{\phi_1}^{s,n} + \frac{\gamma_1+\gamma_2}{\gamma_1-\gamma_2}d_{p_1}^{s,n} - \frac{2\gamma_1}{\gamma_1-\gamma_2}d_{p_2}^{s,n}\right)$$

$$a_{2,r}^{s,n} := a_{2,r}^s - a_{2,r}^n = N_{2,r}^{s,n} - \frac{1}{\lambda_2}\left(d_{\phi_2}^{s,n} + \frac{2\gamma_2}{\gamma_1-\gamma_2}d_{p_1}^{s,n} - \frac{\gamma_1+\gamma_2}{\gamma_1-\gamma_2}d_{p_2}^{s,n}\right),$$

and $N_{i,r}^s$ are integer ambiguities for mobile station r to satellite s, $N_{i,r}^{s,n}$ are satellite-differenced integer ambiguities for mobile station r and between satellite s and reference satellite n, $d_{p_i,r}$ are code hardware delays for mobile station r, $d_{\phi_i,r}$ are phase hardware delays for mobile station r, $d_{p_i}^s$ are code hardware delays for satellite s, $d_{\phi_i}^s$ are phase hardware delays for satellite, $d_{p_i}^{s,n}$ are satellite-differenced code hardware delays between satellite s and reference satellite n, and $d_{\phi_i}^{s,n}$ are satellite-differenced phase hardware delays between satellite s and reference satellite n; and wherein the PPP-IAR corrections are applied to the functional model.

13. The GNSS signal correction system to claim 11, wherein the one or more processors are further configured to:

derive satellite-satellite single-differenced PPP-IAR corrections from individual reference stations;

derive geometry-based wide-lane (WL) hardware delays and ionosphere-free combination of satellite-satellite single-differenced PPP-IAR corrections;

merge of WL hardware delays;

derive and merge of L1, or L2 or narrow-lane (NL) hardware delays;

transform WL hardware delays and L1, L2 or NL hardware delays to L1 and L2 hardware delays.

14. The GNSS signal correction system to claim 13, wherein the geometry-based WL is calculated by $a_{wl,a}^{s,n} = a_{1,a}^{s,n} - a_{2,a}^{s,n}$, the WL hardware delays are separated from the nearest integers by $b_{wl,a}^{s,n} := a_{wl,a}^{s,n} - \lfloor a_{wl,a}^{s,n} \rfloor$, and the WL hardware delays of all reference stations are used to compute site-independent WL hardware delays using $b_{wl}^{s,n} := \langle b_{wl,j}^{s,n} \rangle$.

15. The GNSS signal correction system to claim 13, wherein the L1 and L2 hardware delay is corrected using the difference between the float double-difference WL float ambiguity and its integer, according to $$\hat{a}_{1,a}^{s,n} := a_{1,a}^{s,n} + \frac{f_2}{f_1-f_2}c_{wl,a}^{s,n} \text{ and } \hat{a}_{2,a}^{s,n} := a_{2,a}^{s,n} + \frac{f_1}{f_1-f_2}c_{wl,a}^{s,n},$$

wherein $$c_{wl,a}^{s,n} := a_{wl,a}^{s,n} - (b_{wl}^s - b_{wl}^n) - N_{wl,a}^{s,n} \text{ and } N_{wl,a}^{s,n} := \lfloor a_{wl,a}^{s,n} - (b_{wl}^s - b_{wl}^n) \rfloor.$$

16. The GNSS signal correction system to claim 13, wherein the NL hardware delay is derived using the ionosphere-free combinations and the WL integer ambiguities:

$$a_{nl,a}^{s,n} := a_{if,a}^{s,n} - \frac{f_2}{f_1-f_2}N_{wl,a}^{s,n} \text{ wherein } a_{if,a}^{s,n} = \frac{f_1 \cdot a_{1,a}^{s,n} - f_2 \cdot a_{2,a}^{s,n}}{f_1 - f_2}.$$

17. The GNSS signal correction system to claim 13, wherein the PPP-IAR corrections for broadcast to the mobile station comprise:

the L1 and L2 hardware delays; or
the WL and L1 hardware delays; or
the WL and NL hardware delays.

18. The mobile station according to claim 12, wherein the functional model is augmented with a stochastic model according to $$E\{y\} = (A \quad B)\begin{pmatrix} a \\ b \end{pmatrix}$$

$$D\{y\} = Q_y$$

wherein $Q_y$ is the covariance matrix of y, $E\{\bullet\}$ and $D\{\bullet\}$ denote expectation and dispersion, respectively, and $$y := \begin{bmatrix} P_{1,r} \\ P_{2,r} \\ \Phi_{1,r} \\ \Phi_{2,r} \end{bmatrix}, A := \begin{bmatrix} \lambda_1 E_{n\times(n-1)} & \\ & \lambda_2 E_{n\times(n-1)} \end{bmatrix},$$

$$B := \begin{bmatrix} \mu_r & M_r & e_n & & \gamma_1 E_{n\times(n-1)} \\ \mu_r & M_r & & e_n & \gamma_2 E_{n\times(n-1)} \\ \mu_r & M_r & e_n & & -\gamma_1 E_{n\times(n-1)} \\ \mu_r & M_r & & e_n & -\gamma_2 E_{n\times(n-1)} \end{bmatrix},$$

$$a := \begin{bmatrix} A_{1,r,sd} \\ A_{2,r,sd} \end{bmatrix}, b := \begin{bmatrix} \Delta x_r \\ T_r \\ t_{p_1,r} \\ t_{p_2,r} \\ t_{\phi_1,r} \\ t_{\phi_2,r} \\ I_{r,sd} \end{bmatrix}$$

and a least squares solution is calculated accordingly.

19. The mobile stations according to claim 12, wherein the received PPP-IAR corrections are applied to the phase observations:

$$y := \begin{bmatrix} P_{1,r} \\ P_{2,r} \\ \Phi_{1,r} - \lambda_1 E_{n\times(n-1)} A_{1,sd} \\ \Phi_{2,r} - \lambda_2 E_{n\times(n-1)} A_{2,sd} \end{bmatrix},$$

and the ambiguity parameters are:

$$a := \begin{bmatrix} N_{1,r} \\ N_{2,r} \end{bmatrix}$$

wherein $N_{i,r} = A_{i,r,sd} - A_{i,sd} = (N_{i,r}^{1,n} \ N_{i,r}^{2,n} \ \ldots \ N_{i,r}^{n-1,n})^T$ and a solution is calculated using an integer-fixing scheme.

20. The mobile stations according to claim 12, wherein the received PPP-IAR corrections are alternatively applied to estimated float ambiguities, resulting in $$\hat{a}' = \hat{a} - A,$$

wherein A is the vector of PPP-IAR corrections,
a fixing scheme is applied to $\hat{a}'$ and $Q_{\hat{a}\hat{a}}$, resulting in integer ambiguities $\check{n}'$, and an ambiguity fixed solution of the rest parameters is then given by $$\check{b} = \hat{b} - Q_{\hat{b}\hat{a}} Q_{\hat{a}\hat{a}}^{-1} (\hat{a}' - \check{a}').$$

* * * * *